A. S. Smith,

Chair Bottom,

No. 2,016. Reissued June 27, 1865

Inventor.
Isaac P. Rice
Assignee of
Austin S. Smith.

Witnesses. J. W. Coombs.
Henry T. Brown.

N. PETERS, PHOTO-LITHOGRAPHER, WASHINGTON, D. C.

UNITED STATES PATENT OFFICE.

ISAAC P. TICE, OF NEW YORK, N. Y., ASSIGNEE, BY MESNE ASSIGNMENTS, OF AUSTIN S. SMITH.

IMPROVED CHAIR BOTTOM OR BACK.

Specification forming part of Letters Patent No. 20,376, dated May 25, 1858; Reissue No. 2,016, dated June 27, 1865.

*To all whom it may concern:*

Be it known that I, ISAAC P. TICE, of the city, county, and State of New York, am the assignee, through mesne assignments, of Letters Patent granted May 25, 1858, to AUSTIN S. SMITH, for a Combined Chair and Cradle; and I do hereby declare that the following is a full, clear, and exact description of the same, reference being had to the accompanying drawings, forming part of this specification, in which—

Figure 1:
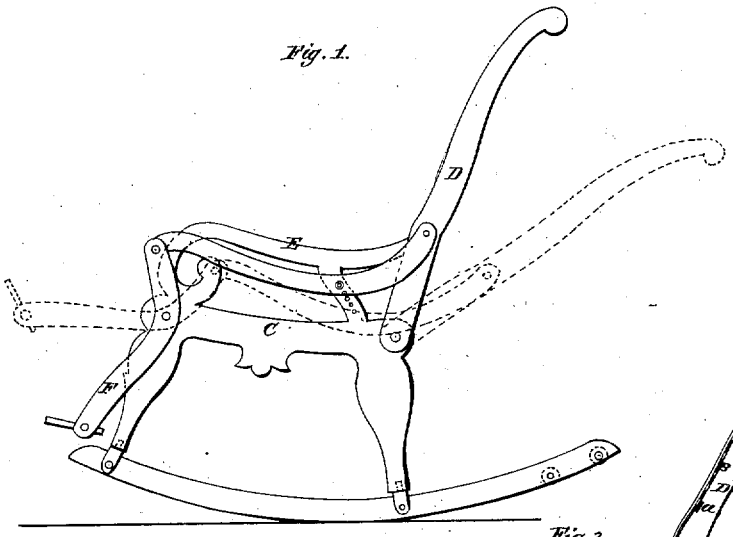
Figure 3:
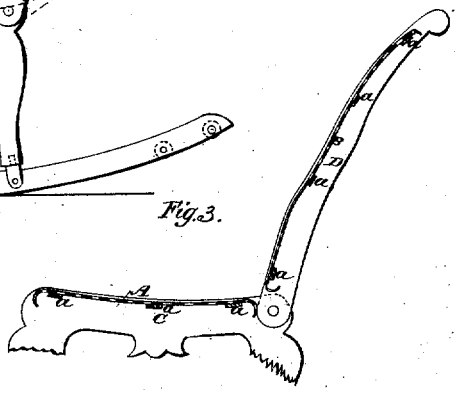
Figure 2:
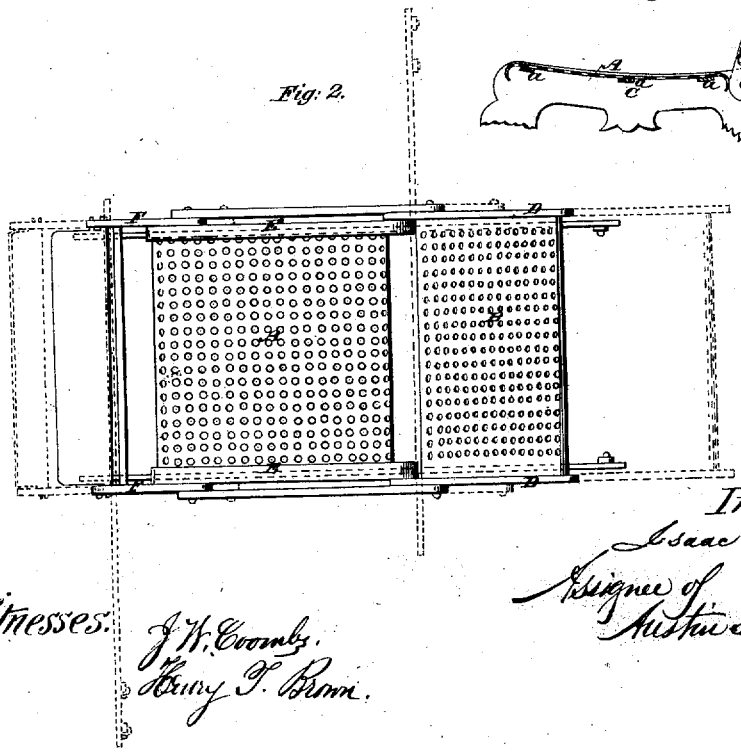

Figure 1 is a side view. Fig. 2 is a plan. Fig. 3 is a vertical section from back to front of the seat and back of the chair.

Similar letters of reference indicate corresponding parts in the several figures.

The want of some suitable substitute for cane for the bottoms or seats and backs of chairs and other articles of furniture used for sitting and recumbent purposes has long been felt in the furniture trade, for the reason that cane bottoms or seats and backs are very expensive for low-priced furniture and will not bear rough usage.

The most important feature of this invention consists in the manufacture of the bottoms or seats and backs of chairs and other articles of furniture for sitting and recumbent purposes of perforated sheet metal, which is at the same time less expensive and more durable than cane.

The manner in which the perforated material may be best employed for the above-mentioned purpose is to construct a supporting frame of wood or other stiff material of suitable form, according to the character of the chair or other piece of furniture, and to attach the edges of the sheet or sheets of perforated metal used for the bottom or seat and back to the said frame by nails, tacks, or other suitable fastenings.

In the combined rocking chair and cradle represented the perforated sheet A, forming the bottom or seat, and the perforated sheet B, forming the back, are attached by soldering to transverse bars or ribs *a a*, Fig. 3, of metal, the ends of which rest upon and are secured to the frames C and D of the bottom or seat and the back, respectively; but it is obvious that if the sheet metal is made of sufficient thickness these cross bars or ribs might be dispensed with and the perforated sheet metal be attached simply to the frames C and D.

The perforated sheets may be of iron or other metal, and its perforations may be of any suitable form—as, for instance, circular—or of a form resembling the interstices or reticulations produced by the weaving or interlacing of the strips of cane in a cane bottom or back.

The perforated sheet metal is not only as good as cane in those respects in which cane is considered superior to other materials or fabrics employed for the bottoms or seats and backs of chairs and other articles of furniture—viz., its coolness and the ventilation it affords to the clothing of persons—but it is cheaper and more durable, and so much smoother as to be less destructive to wearing-apparel.

In the combined rocking chair and cradle, which is represented as an example of the application of the invention, the frame C of the bottom or seat and the frame D of the back, are so pivoted or jointed together, and, with the arms E E and the foot-rest bars F F, so jointed with the arms E E and frame C as to be converted into a chair or a cradle at pleasure.

What I claim as the invention of AUSTIN S. SMITH, and desire to secure by Letters Patent, is—

The employment of perforated sheet metal in the bottoms or seats and backs of chairs and other articles of furniture for sitting and recumbent purposes, substantially as herein described.

ISAAC P. TICE.

Witnesses:
J. W. COOMBS,
HENRY T. BROWN.